US011735750B2

United States Patent
Verma et al.

(10) Patent No.: US 11,735,750 B2
(45) Date of Patent: Aug. 22, 2023

(54) APPARATUS FOR DILUTION OF HYDROGEN CONCENTRATION IN A FUEL CELL EXHAUST SYSTEM

(71) Applicant: GM GLOBAL TECHNOLOGY OPERATIONS LLC, Detroit, MI (US)

(72) Inventors: Saurabh Kumar Verma, Benguluru (IN); Kenneth R. Dubois, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 17/573,106

(22) Filed: Jan. 11, 2022

(65) Prior Publication Data

US 2023/0223567 A1    Jul. 13, 2023

(51) Int. Cl.
- *H01M 8/04* (2016.01)
- *H01M 8/04089* (2016.01)
- *H01M 8/02* (2016.01)
- *H01M 8/04746* (2016.01)

(52) U.S. Cl.
CPC ......... *H01M 8/04089* (2013.01); *H01M 8/02* (2013.01); *H01M 8/04753* (2013.01); *H01M 2250/20* (2013.01)

(58) Field of Classification Search
CPC ........ H01M 8/04089; H01M 8/04753; H01M 8/02; H01M 2250/20
USPC .......................................... 429/408
See application file for complete search history.

(56) References Cited

U.S. PATENT DOCUMENTS

| | | | |
|---|---|---|---|
| 2007/0116621 A1* | 5/2007 | De Vaal | H01M 8/04231 429/408 |
| 2013/0094842 A1* | 4/2013 | Ohtsuka | H01M 8/04014 137/561 A |
| 2018/0102560 A1* | 4/2018 | Jung | F24F 8/167 |
| 2019/0181478 A1* | 6/2019 | Jung | B60L 50/71 |
| 2019/0237779 A1* | 8/2019 | Inamoto | B60L 50/75 |
| 2021/0111421 A1* | 4/2021 | Martuscelli | H01M 8/04291 |
| 2022/0297072 A1* | 9/2022 | Nunokawa | B60L 50/72 |

\* cited by examiner

*Primary Examiner* — James M Erwin
(74) *Attorney, Agent, or Firm* — Quinn IP Law

(57) ABSTRACT

An apparatus for dilution of hydrogen concentration in a fuel cell exhaust system is provided. The apparatus includes a fuel cell exhaust line configured for receiving a flow of gas from a connected fuel cell and including a flow of hydrogen gas. The apparatus further includes a mixing chamber disposed to receive the flow of hydrogen gas and configured for mixing a flow of air with the flow of hydrogen gas. The mixing chamber includes a mixing mesh including at least one tab feature configured for altering a flow direction of at least a portion of one of the flow of hydrogen gas and for creating a turbulent flow region within the mixing chamber.

20 Claims, 6 Drawing Sheets

APPARATUS FOR DILUTION OF HYDROGEN CONCENTRATION IN A FUEL CELL EXHAUST SYSTEM

INTRODUCTION

The disclosure generally relates to an apparatus for dilution of hydrogen concentration in a fuel cell exhaust system.

A fuel cell may be utilized to provide electrical energy. A fuel cell may include an anode and a cathode. An electrolyte may be provided between the anode and cathode to facilitate ion transfer between the anode and the cathode. The anode may be provided with a flow of hydrogen gas. The cathode may be provided with a flow of oxygen gas, for example, through a flow of air. The anode and the cathode may react with the hydrogen gas and the oxygen gas, respectively, exchange ions through the electrolyte, and generate an electric current that may be useful to power a system such as an electrically powered vehicle.

SUMMARY

An apparatus for dilution of hydrogen concentration in a fuel cell exhaust system is provided. The apparatus includes a fuel cell exhaust line configured for receiving a flow of gas from a connected fuel cell and including a flow of hydrogen gas. The apparatus further includes a mixing chamber disposed to receive the flow of hydrogen gas and configured for mixing a flow of air with the flow of hydrogen gas. The mixing chamber includes a mixing mesh including at least one tab feature configured for altering a flow direction of at least a portion of one of the flow of hydrogen gas and for creating a turbulent flow region within the mixing chamber.

In some embodiments, the mixing mesh further includes a wire frame formed in a closed polygonal shape. The at least one tab feature is connected to the wire frame.

In some embodiments, the wire frame is disposed in a perpendicular orientation to a longitudinal axis of the mixing chamber. The mixing mesh includes a plurality of tab features. At least one of the plurality of tab features is angled away from the perpendicular orientation of the wire frame.

In some embodiments, the mixing chamber includes cylindrical walls.

In some embodiments, the mixing chamber includes a tapered portion.

In some embodiments, the mixing chamber includes an expanding portion.

In some embodiments, the mixing chamber includes a first end configured for receiving the flow of hydrogen gas from the fuel cell exhaust line and a tapered portion connected to the first end and including the mixing mesh. The mixing chamber further includes a cylindrically-shaped center portion connected to the tapered portion and an expanding portion connected to the cylindrically-shaped center portion.

According to one alternative embodiment, a fuel cell system including a mixing chamber configured for dilution of hydrogen concentration in a fuel cell exhaust gas flow is provided. The fuel cell system includes a fuel cell including an anode and a cathode, a fuel cell exhaust line configured for receiving a flow of gas from the fuel cell and including a flow of hydrogen gas, and the mixing chamber disposed to receive the flow of hydrogen gas. The mixing chamber is configured for mixing a flow of air with the flow of hydrogen gas. The mixing chamber includes a mixing mesh including at least one tab feature configured for altering a flow direction of at least a portion of one of the flow of hydrogen gas and for creating a turbulent flow region within the mixing chamber.

In some embodiments, the mixing mesh further includes a wire frame formed in a closed polygonal shape. The at least one tab feature is connected to the wire frame.

In some embodiments, the wire frame is disposed in a perpendicular orientation to a longitudinal axis of the mixing chamber, and the mixing mesh includes a plurality of tab features. At least one of the plurality of tab features is angled away from the perpendicular orientation of the wire frame.

In some embodiments, the mixing chamber includes cylindrical walls.

In some embodiments, the mixing chamber includes a tapered portion.

In some embodiments, the mixing chamber includes an expanding portion.

In some embodiments, the mixing chamber includes a first end configured for receiving the flow of hydrogen gas from the fuel cell exhaust line. The mixing chamber further includes a tapered portion connected to the first end and including the mixing mesh, a cylindrically-shaped center portion connected to the tapered portion, and an expanding portion connected to the cylindrically-shaped center portion.

According to one alternative embodiment, a vehicle including a fuel cell system including a mixing chamber configured for dilution of hydrogen concentration in a fuel cell exhaust gas flow is provided. The vehicle includes a fuel cell including an anode and a cathode, a fuel cell exhaust line configured for receiving a flow of gas from the fuel cell and including a flow of hydrogen gas, and the mixing chamber disposed to receive the flow of hydrogen gas. The mixing chamber is configured for mixing a flow of air with the flow of hydrogen gas. The mixing chamber includes a mixing mesh including at least one tab feature configured for altering a flow direction of at least a portion of one of the flow of hydrogen gas and for creating a turbulent flow region within the mixing chamber.

In some embodiments, the mixing mesh further includes a wire frame formed in a closed polygonal shape. The at least one tab feature is connected to the wire frame.

In some embodiments, the wire frame is disposed in a perpendicular orientation to a longitudinal axis of the mixing chamber, and the mixing mesh includes a plurality of tab features. At least one of the plurality of tab features is angled away from the perpendicular orientation of the wire frame.

In some embodiments, the mixing chamber includes a tapered portion.

In some embodiments, the mixing chamber includes an expanding portion.

In some embodiments, the mixing chamber includes a first end configured for receiving the flow of hydrogen gas from the fuel cell exhaust line, a tapered portion connected to the first end and including the mixing mesh, a cylindrically-shaped center portion connected to the tapered portion, and an expanding portion connected to the cylindrically-shaped center portion.

The above features and advantages and other features and advantages of the present disclosure are readily apparent from the following detailed description of the best modes for carrying out the disclosure when taken in connection with the accompanying drawings.

DETAILED DESCRIPTION

Under some conditions, a fuel cell may not fully react the hydrogen gas supplied to the anode. As a result, a component of an exhaust gas flow emanating from the fuel cell may include hydrogen gas. Hydrogen gas is reactive and may be undesirable in an ambient environment in excessive concentrations.

An apparatus is provided for dilution of hydrogen concentration in a fuel cell exhaust system. Ambient air may be drawn into an exhaust gas flow, for example, through a venturi effect. This ambient air may be drawn into the exhaust gas flow to effectively dilute hydrogen gas in the exhaust gas flow and thus avoid reactivity in the hydrogen gas. However, a flow of hydrogen gas and a flow of air in an exhaust line may remain effectively separate within the exhaust line with poor mixing to dilute the hydrogen gas to an unreactive state. The provided apparatus includes a mixing mesh useful to create turbulence in the exhaust gas flow and facilitate mixing of component gases within the exhaust gas flow.

In some embodiments, common operation of the fuel cell system with an unimproved exhaust line may not result in hydrogen concentrations above a threshold. However, harsh transient conditions or a stuck open fuel injector may cause the system to operate outside of typical ranges. The included improvements including a mixing mesh disposed within the exhaust gas flow mix the exhaust gas and avoid spikes or unexpected periods of high hydrogen concentration from affecting the hydrogen concentration in an output of the exhaust gas flow and result in a lower mole fraction of exhaust has in the output of the exhaust gas flow.

Figure 1:
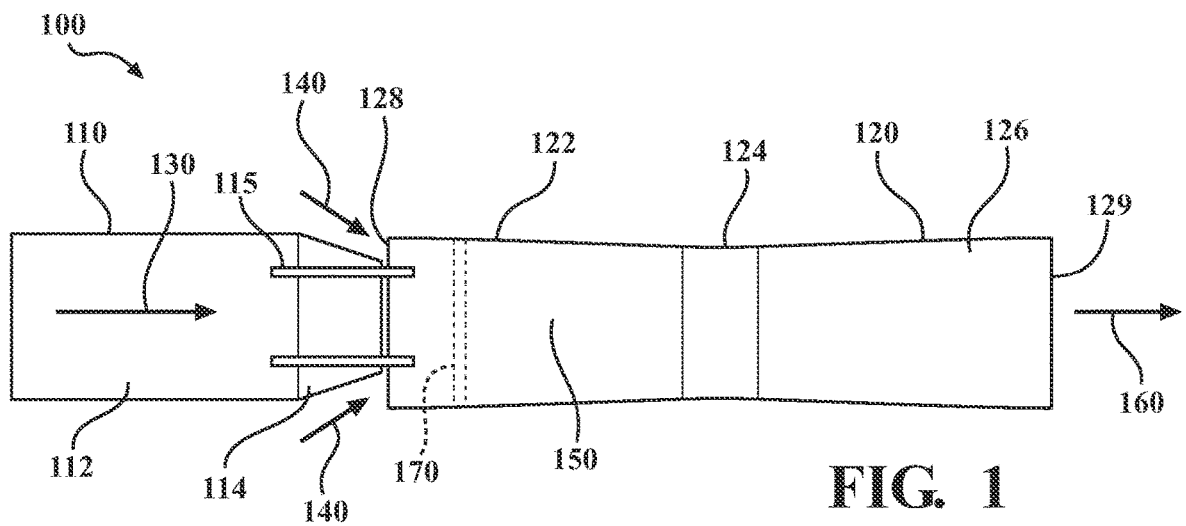
FIG. 1 schematically illustrates an exhaust gas mixing device useful to mix a flow of hydrogen gas within an exhaust gas flow with a flow of air in order to dilute the hydrogen gas, in accordance with the present disclosure.

Referring now to the drawings, wherein like reference numbers refer to like features throughout the several views, FIG. 1 schematically illustrates an exhaust gas mixing device 100 useful to mix a flow of hydrogen gas 130 within an exhaust gas flow with a flow of air 140 configured for diluting the hydrogen gas. The exhaust gas mixing device 100 includes fuel cell exhaust line 110 and mixing chamber 120. The mixing chamber 120 is illustrated including a first end 128 defining an upstream end of the mixing chamber 120 and a second end 129 defining a downstream end of the mixing chamber 120. The mixing chamber 120 may be described as a hollow tube, and each of the first end 128 and the second end 129 may be described as open ends of the hollow tube. The mixing chamber 120 is attached to the fuel cell exhaust line 110 with optional attachment brackets 115. The fuel cell exhaust line 110 is configured for receiving a flow of gas from a connected fuel cell which includes reactants and waste products from the fuel cell reaction. The fuel cell exhaust line 110 may include a flow of hydrogen gas 130 which may be an entirety of the exhaust gas flow within the fuel cell exhaust line 110 or which may be a component of the exhaust gas flow within the fuel cell exhaust line 110. The fuel cell exhaust line 110 may include a cylindrical portion 112 and a tapered nozzle portion 114. The tapered nozzle portion 114 may decrease a cross section of the flow of hydrogen gas 130 and may increase a velocity of the flow of hydrogen gas 130 as compared with the flow of hydrogen gas 130 within the cylindrical portion 112. The flow of hydrogen gas 130 exits the tapered nozzle portion 114 and enters the first end 128 of the mixing chamber 120. The tapered nozzle portion 114 does not cover an entirety of the first end 128, such that a gap exists between the tapered nozzle portion 114 and the first end 128. As a result of the gap, the flow of air 140 may be drawn from ambient air into the first end 128 of the mixing chamber 120 by a venturi effect of the flow of hydrogen gas 130 entering the first end 128.

The flow of hydrogen gas 130 and the flow of air 140 flow simultaneously through the mixing chamber 120. If the mixing chamber 120 were a straight-walled cylinder with an open, clear cross-section throughout the mixing chamber 120, the flow of hydrogen gas 130 and the flow of air 140 may mix marginally, with a component of an exiting gas flow 160 exiting the second end 129 of the mixing chamber 120 including an essentially unmixed portion of the flow of hydrogen gas 130. Such an unmixed portion of the flow of hydrogen gas 130 may include hydrogen gas in in a condition or concentration to be reactive.

A mixing mesh 170 is provided within the mixing chamber 120. The mixing mesh 170 is disposed in a perpendicular orientation to a longitudinal axis of the mixing chamber 120. The mixing mesh 170 may include one or more tab features configured for altering a flow direction of at least a portion of one of the flow of hydrogen gas 130 and the flow of air 140, such that a turbulent flow region 150 is created within the mixing chamber 120 downstream of the mixing mesh 170. As a result of the turbulent flow region 150, the exiting gas flow 160 may include a well-mixed gas flow, including hydrogen gas diluted with air.

The mixing chamber 120 is illustrated including a tapered portion 122, a relatively narrow central portion 124, and an expanding portion 126. As gas within the mixing chamber 120 flows past the tapered portion 122 and the central portion 124 and into the expanding portion 126, additional turbulence is created, enhancing mixing of the gases within the mixing chamber 120.

The mixing chamber 120 may include alternative configurations. For example, the walls of the mixing chamber 120 may be straight or cylindrical. In another example, the walls of the mixing chamber 120 may include a tapered nozzle portion or an expanding portion but not both. In another example, the opening of mixing chamber 120 may be coincident or unitarily formed with the outlet of the fuel cell exhaust line 110, with air being introduced by one or more tubes projecting through the wall of the mixing chamber 120 perpendicular to the flow of the hydrogen gas 130.

Figure 2:
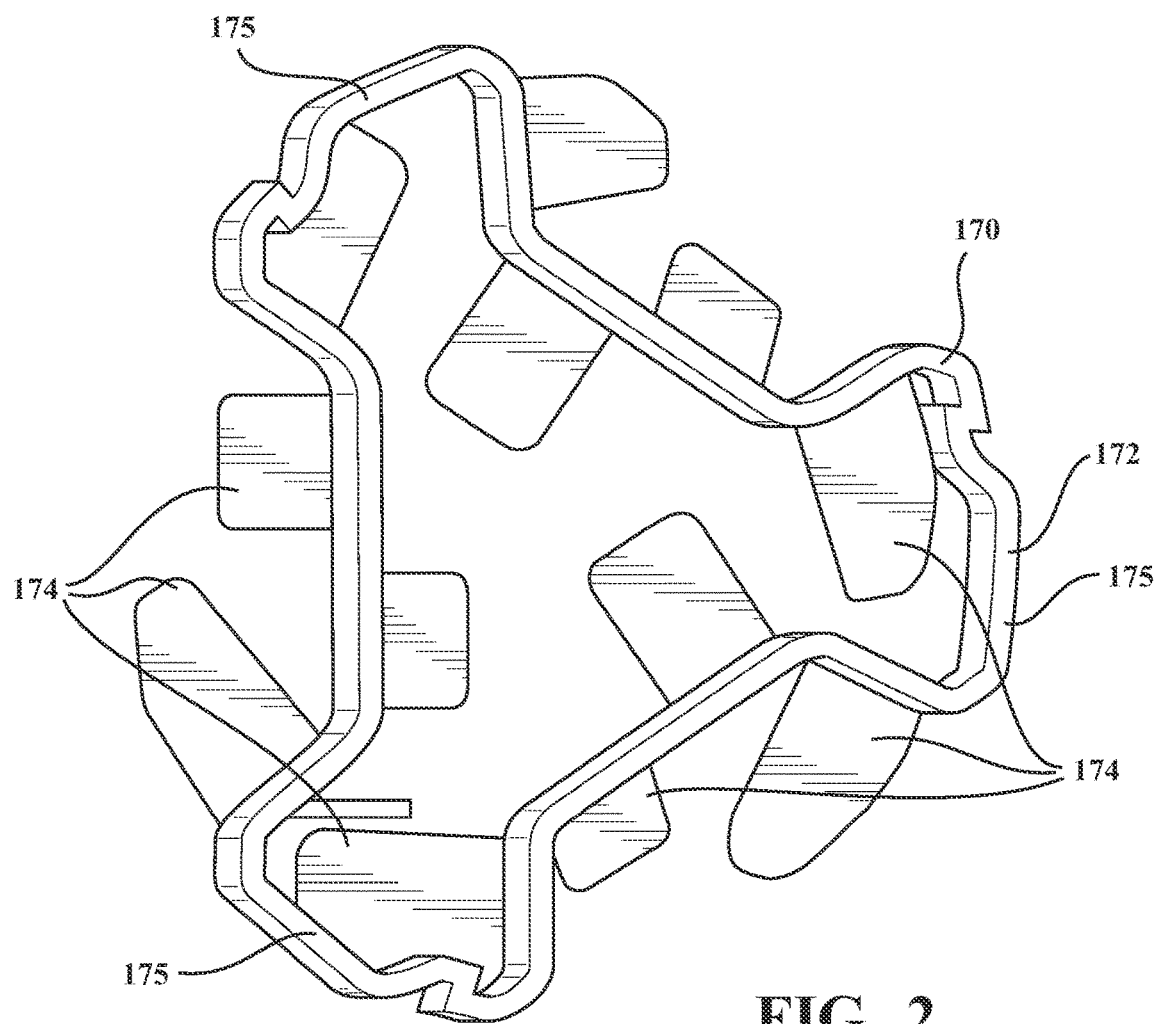
FIG. 2 schematically illustrates in a front perspective view an exemplary mixing mesh, in accordance with the present disclosure.

FIG. 2 schematically illustrates in a front perspective view an exemplary mixing mesh 170. The mixing mesh 170 includes a wire frame 172. The exemplary wire frame 172 includes a closed polygonal shape and includes outer features 175 configured for contact with an interior surface of the mixing chamber 120 of FIG. 1. In one embodiment, the features 175 may be welded or otherwise joined to the interior surface of the mixing chamber 120 of FIG. 1. The mixing mesh 170 further includes a plurality of tabs 174 connected to the wire frame 172. The tabs 174 may be formed in a plane with the wire frame 172. In the embodiment of FIG. 2, the tabs 174 are bent or formed at an angle with respect to a plane defined by the wire frame 172. As gases move upstream of the mixing mesh 170, the gases may move in a longitudinal direction of the mixing chamber 120 of FIG. 1. As gases move past the tabs 174, the tabs 174 act upon the gases and cause the gases to move in directions different from the longitudinal direction of the mixing chamber 120 of FIG. 1. This movement of the gases in non-longitudinal directions results in turbulence or mixing of the gases moving past the mixing mesh 170.

Figure 3:
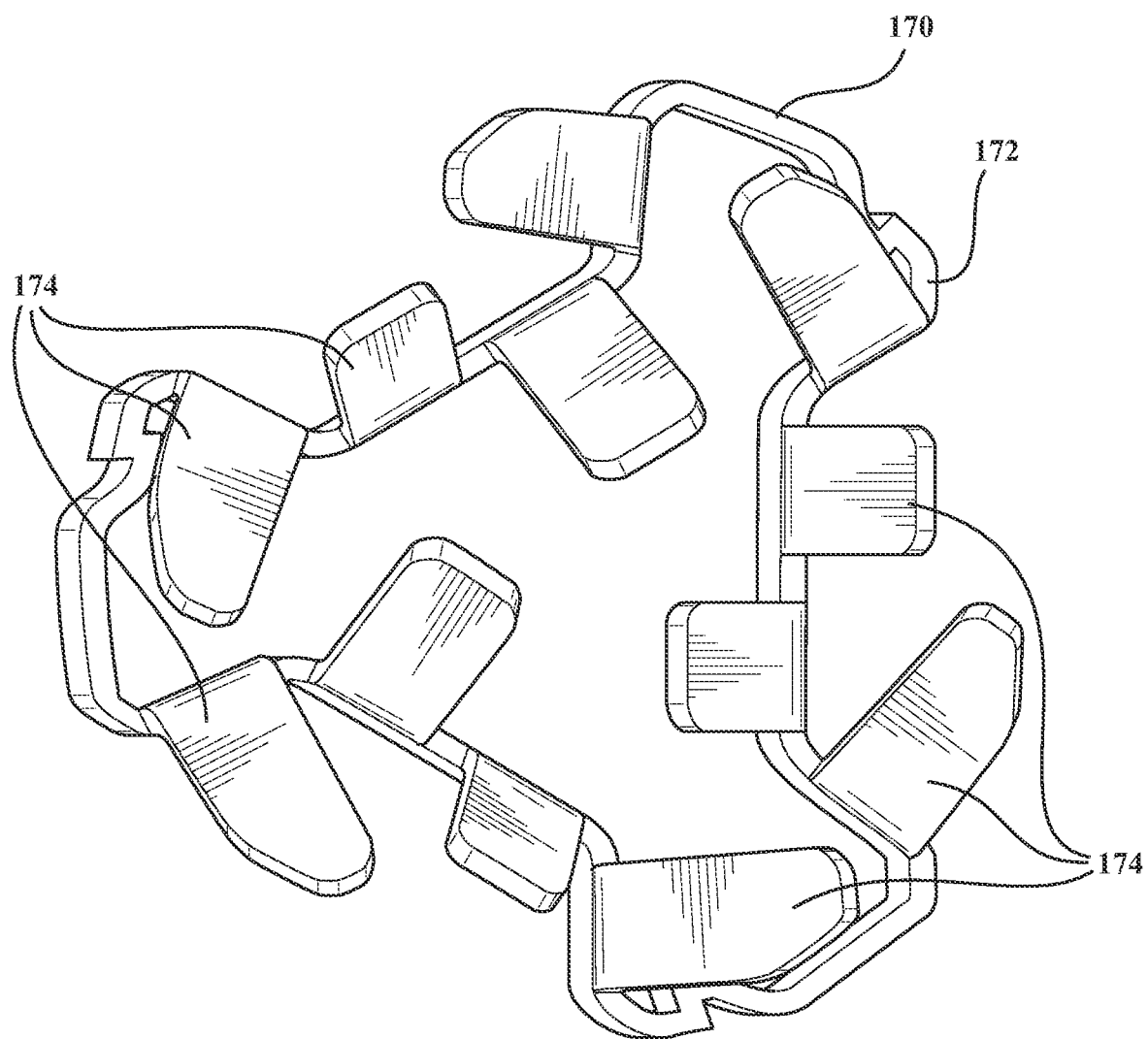
FIG. 3 schematically illustrates in a rear perspective view the mixing mesh of FIG. 2, in accordance with the present disclosure.

FIG. 3 schematically illustrates in a rear perspective view the mixing mesh 170 of FIG. 2. The mixing mesh 170 includes a wire frame 172 and tabs 174.

Figure 4:
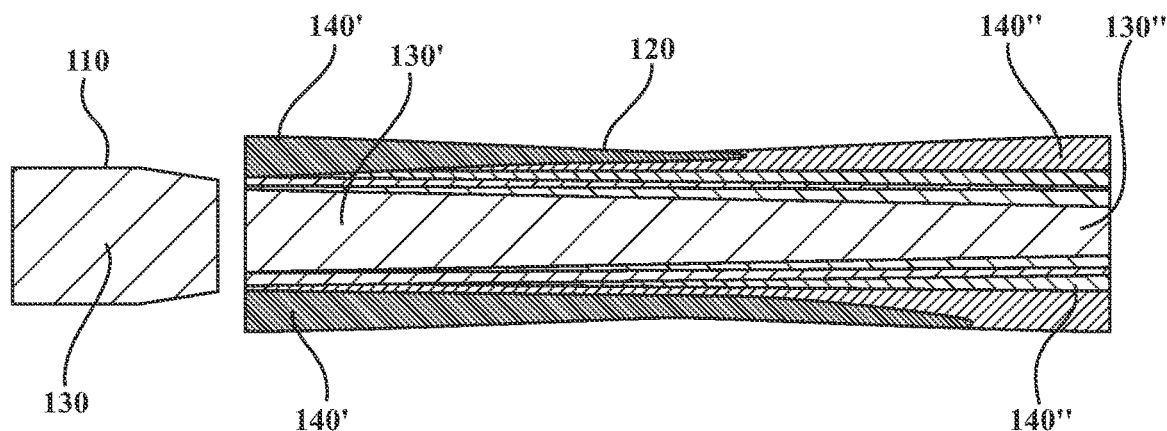
FIG. 4 illustrates exemplary test results illustrating gas mixing within a mixing chamber without a mixing mesh disposed within the mixing chamber of FIG. 1, in accordance with the present disclosure.

FIG. 4 illustrates exemplary test results illustrating gas mixing within a mixing chamber without a mixing mesh disposed within the mixing chamber 120 of FIG. 1. The flow of hydrogen gas 130 is illustrated within the fuel cell exhaust line 110. Flow of hydrogen gas 130' is illustrated representing the flow of hydrogen gas 130 shortly after it enters the mixing chamber 120 of FIG. 1. Flow of hydrogen gas 130'' is illustrated representing the flow of hydrogen gas 130 after it transitions through the mixing chamber 120 of FIG. 1. Similarly, flows of air 140' are illustrated representing air that is drawn in through the first end 128 of FIG. 1 by a venturi effect created by the flow of hydrogen gas 130 entering the mixing chamber 120. The test results illustrated show that the flow of hydrogen gas 130' remains largely unmixed throughout the mixing chamber. Flows of air 140', as they pass through the expanding portion of the mixing chamber 120, become moderately mixed flows 140''.

Figure 5:
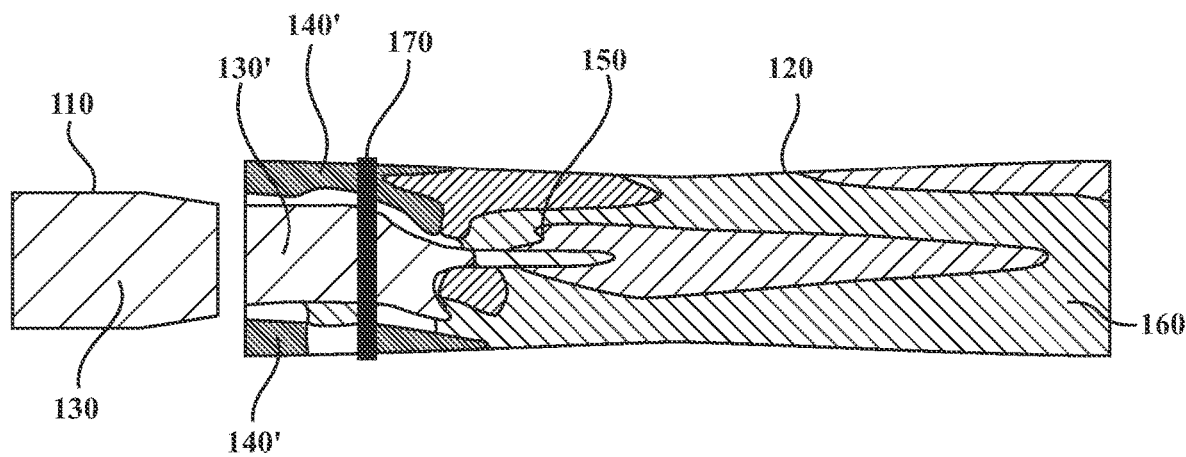
FIG. 5 illustrates exemplary test results illustrating gas mixing within the mixing chamber of FIG. 1 including the mixing mesh, in accordance with the present disclosure.

FIG. 5 illustrates exemplary test results illustrating gas mixing within the mixing chamber 120 of FIG. 1 including the mixing mesh 170. The flow of hydrogen gas 130 is illustrated within the fuel cell exhaust line 110. Flow of hydrogen gas 130' is illustrated representing the flow of hydrogen gas 130 shortly after it enters the mixing chamber 120 of FIG. 1. Similarly, flows of air 140' are illustrated representing air that is drawn in through the first end 128 of FIG. 1 by a venturi effect created by the flow of hydrogen gas 130 entering the mixing chamber 120. The mixing mesh 170 of FIG. 1 is illustrated within the mixing chamber 120. The turbulent flow region 150 is illustrated, wherein the flow of hydrogen gas 130' and the flows of air 140', which are visibly distinct upstream or to the left of the mixing mesh 170, dissipate quickly into an indiscernible mixed flow downstream or to the right of the mixing mesh 170. As a result, the exiting gas flow 160 is well mixed, and the previously concentrated hydrogen gas is fully or substantially mixed and thus diluted by air.

Figure 6:
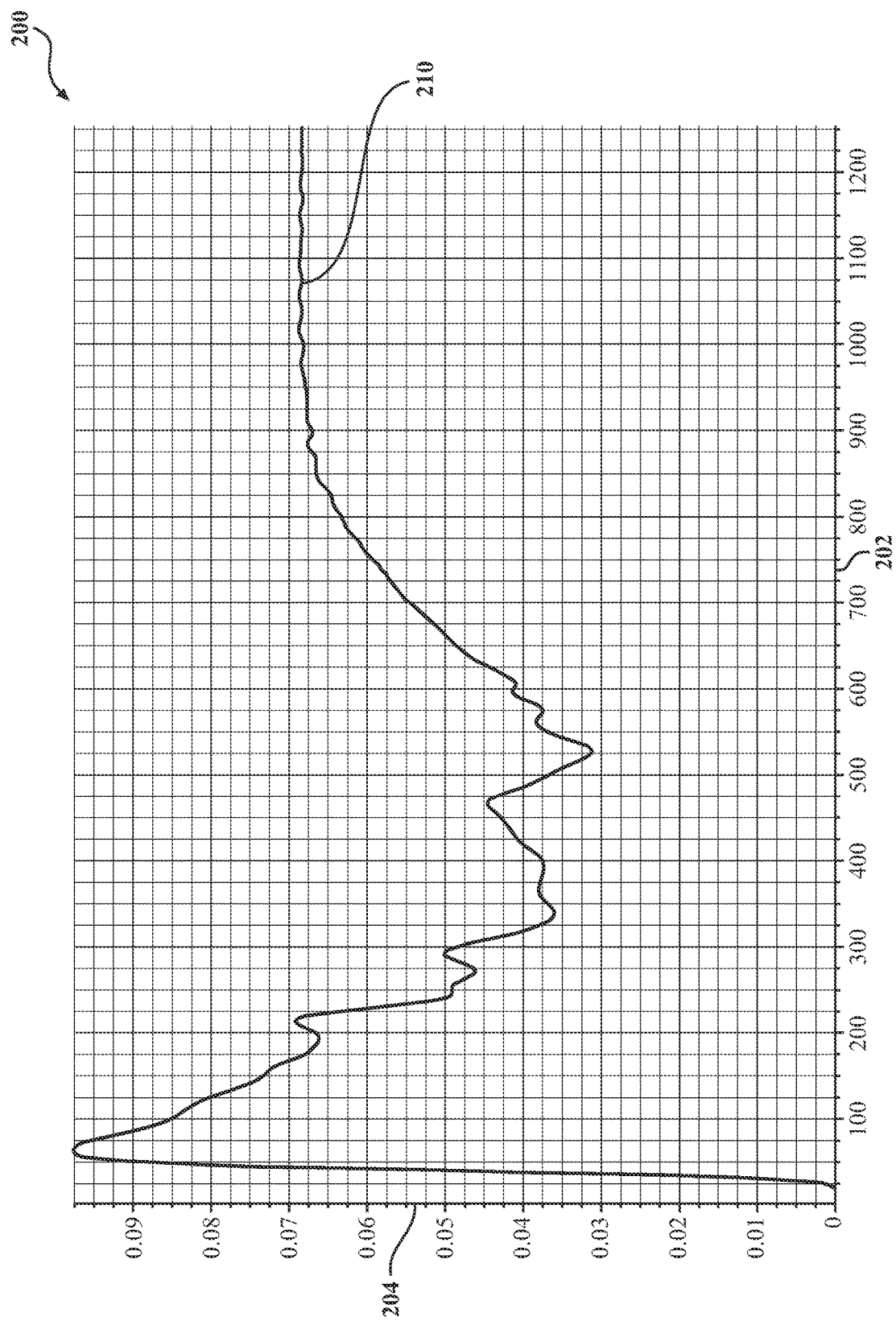
FIG. 6 is a graph illustrating exemplary test results illustrating a mole fraction of hydrogen gas in a mixing chamber without a mixing mesh disposed within the mixing chamber of FIG. 1, in accordance with the present disclosure.

FIG. 6 is a graph 200 illustrating exemplary test results illustrating a mole fraction of hydrogen gas in a mixing chamber without a mixing mesh 170 disposed within the mixing chamber 120 of FIG. 1. A horizontal axis 202 is illustrated describing a length of the mixing chamber 120 of FIG. 1, with a left side of the horizontal axis corresponding to an inlet of the mixing chamber 120 and with a right side of the horizontal axis corresponding to an outlet of the mixing chamber 120 where the exhaust gas flow is vented to the ambient air. A vertical axis 204 is illustrated describing a mole fraction of hydrogen gas measured in the mixing chamber 120 of FIG. 1. The plot 210 illustrates results of sampling the hydrogen gas at various points within the mixing chamber 120 of FIG. 1, where no mixing mesh is present within the mixing chamber 120. The initial spike in the plot 210 on a left side of the graph 200 corresponds to hydrogen gas presence at the inlet of the mixing chamber 120 of FIG. 1. A stabilized value in the plot 210 on a right side of the graph 200 corresponds to hydrogen gas presence at the outlet of the mixing chamber 120 of FIG. 1. Transient measurements between the spike on the left side of the plot 210 and the stabilized value on the right side of the plot 210 represent mixing and inconclusive readings of turbulent flow within the mixing chamber 120 of FIG. 1 between the inlet and the outlet. One may see that mole fraction value at the left side of the plot 210 of the graph 200 shows stabilization of the hydrogen gas mole fraction at just below 0.07 or 7% hydrogen gas presence in the exhaust gas flow exiting the mixing chamber 120 of FIG. 1.

Figure 7:
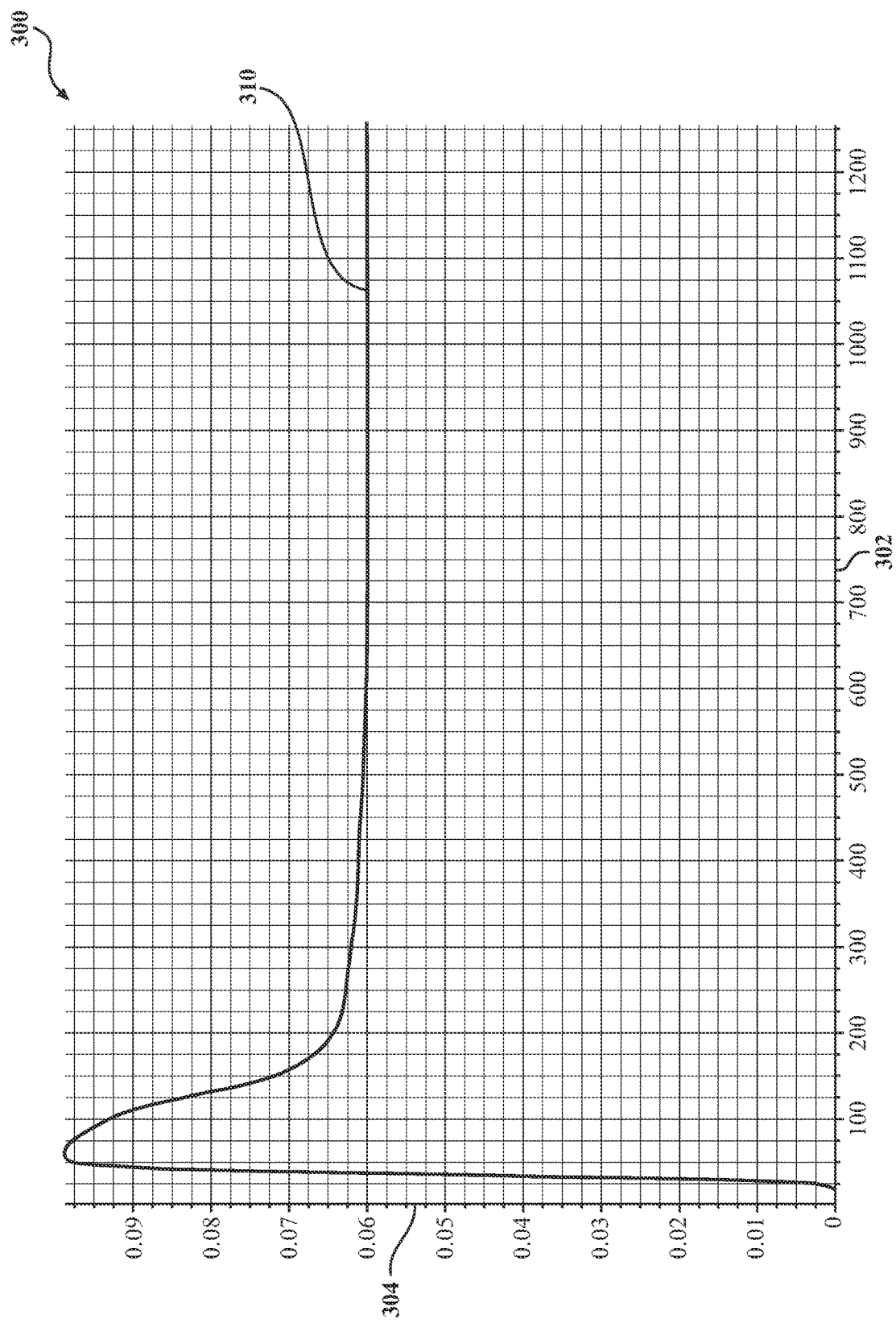
FIG. 7 is a graph illustrating exemplary test results illustrating a mole fraction of hydrogen gas in a mixing chamber with a mixing mesh disposed within the mixing chamber of FIG. 1, in accordance with the present disclosure.

FIG. 7 is a graph 300 illustrating exemplary test results illustrating a mole fraction of hydrogen gas in a mixing chamber with a mixing mesh 170 disposed within the mixing chamber 120 of FIG. 1. A horizontal axis 302 is illustrated describing a length of the mixing chamber 120 of FIG. 1, with a left side of the horizontal axis corresponding to an inlet of the mixing chamber 120 and with a right side of the horizontal axis corresponding to an outlet of the mixing chamber 120 where the exhaust gas flow is vented to the ambient air. A vertical axis 304 is illustrated describing a mole fraction of hydrogen gas measured in the mixing chamber. The plot 310 illustrates results of sampling the hydrogen gas at various points within the mixing chamber 120 of FIG. 1, where the mixing mesh 170 is present within the mixing chamber 120. The initial spike in the plot 310 on a left side of the graph 300 corresponds to hydrogen gas presence at the inlet of the mixing chamber 120 of FIG. 1. One may see that the initial mole fraction value on graph 300 corresponding to the spike in plot 310 is similar to the initial mole fraction value on graph 200 corresponding to the spike in plot 210. The exhaust gas flow entering the mixing chamber 120 of FIG. 1 includes similar hydrogen gas mole fractions in both the test illustrated in graph 200 and the test illustrated in graph 300. A stabilized value in the plot 310 on a right side of the graph 300 corresponds to hydrogen gas presence at the outlet of the mixing chamber 120 of FIG. 1. The stabilized value on the right side of plot 310 is approximately 0.06 or 6% hydrogen gas presence in the exhaust gas flow exiting the mixing chamber 120 of FIG. 1. Comparing the stabilized values of plot 210 of FIG. 6 and plot 310 of FIG. 7, one may see that the improved mixing within the mixing chamber 120 of FIG. 1 achieved by the presence of the mixing mesh 170 enables more air to be mixed with the exhaust gas flow, thereby achieving a lower hydrogen gas presence in the exhaust gas flow exiting the mixing chamber 120.

Figure 8:
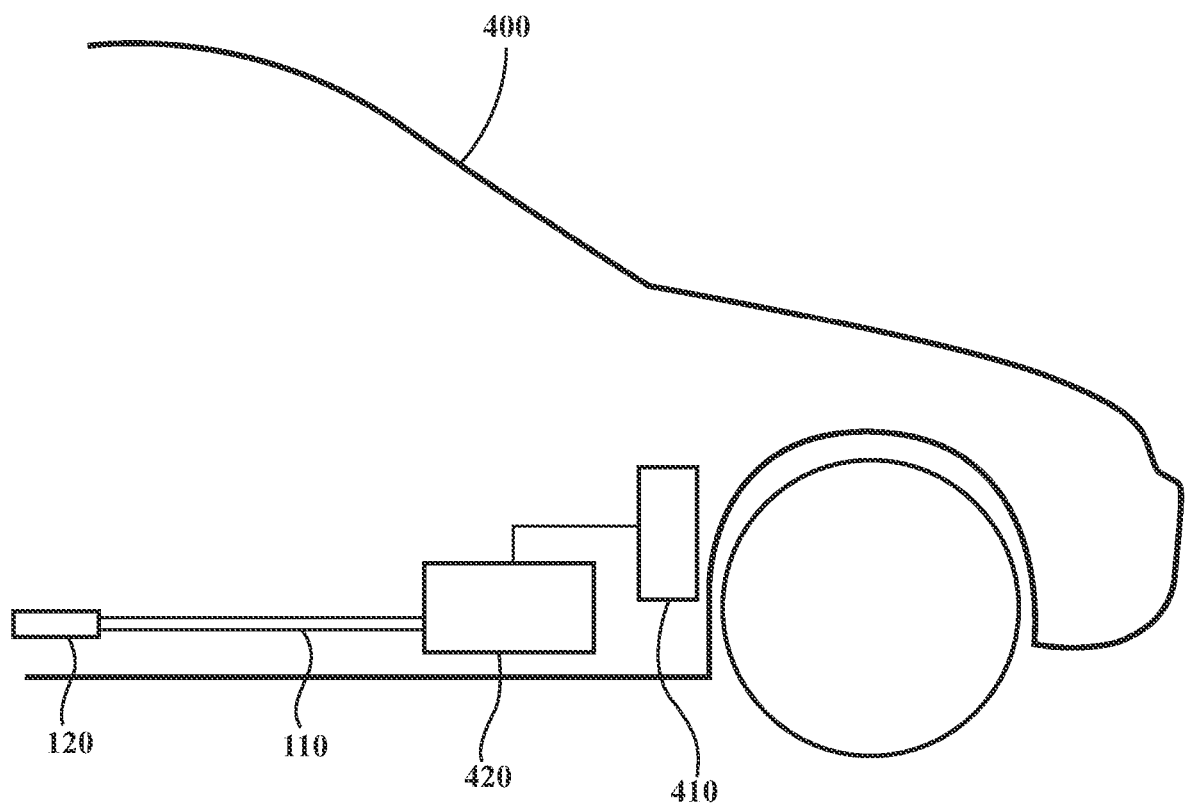
FIG. 8 schematically illustrates an exemplary vehicle including a fuel cell system including a fuel cell exhaust line equipped with a mixing chamber, in accordance with the present disclosure.

FIG. 8 schematically illustrates an exemplary vehicle 400 including a fuel cell system 420, the exhaust line 110, and the mixing chamber 120. A hydrogen storage tank 410 provides a flow of hydrogen gas to the fuel cell system 420, which utilizes the flow of hydrogen gas to create electrical energy for use by the vehicle 400. The fuel cell system 420 generates a flow of exhaust gas including some portion of the flow including hydrogen gas. The mixing chamber 120 operates as disclosed herein to reduce concentration of hydrogen gas in the exhaust gas flow as it exits the vehicle 400.

While the best modes for carrying out the disclosure have been described in detail, those familiar with the art to which this disclosure relates will recognize various alternative designs and embodiments for practicing the disclosure within the scope of the appended claims.

What is claimed is:

1. An apparatus for dilution of hydrogen concentration in a fuel cell exhaust system, comprising:
    a fuel cell exhaust line configured for receiving a flow of gas from a connected fuel cell and including a flow of hydrogen gas; and
    a mixing chamber disposed to receive the flow of hydrogen gas and configured for mixing a flow of air with the flow of hydrogen gas, wherein the mixing chamber includes a mixing mesh including at least one tab feature configured for altering a flow direction of the flow of hydrogen gas and for creating a turbulent flow region within the mixing chamber.

2. The apparatus of claim 1, wherein the mixing mesh further includes a wire frame formed in a closed polygonal shape; and
    wherein the at least one tab feature is connected to the wire frame.

3. The apparatus of claim 2, wherein the wire frame is disposed in a perpendicular orientation to a longitudinal axis of the mixing chamber;
    wherein the mixing mesh includes a plurality of tab features; and
    wherein at least one of the plurality of tab features is angled away from the perpendicular orientation of the wire frame.

4. The apparatus of claim 1, wherein the mixing chamber includes cylindrical walls.

5. The apparatus of claim 1, wherein the mixing chamber includes a tapered portion.

6. The apparatus of claim 1, wherein the mixing chamber includes an expanding portion.

7. The apparatus of claim 1, wherein the mixing chamber includes:
    a first end configured for receiving the flow of hydrogen gas from the fuel cell exhaust line;
    a tapered portion connected to the first end and including the mixing mesh;
    a cylindrically-shaped center portion connected to the tapered portion; and
    an expanding portion connected to the cylindrically-shaped center portion.

8. A fuel cell system including a mixing chamber configured for dilution of hydrogen concentration in a fuel cell exhaust gas flow, the fuel cell system comprising:
    a fuel cell including an anode and a cathode;
    a fuel cell exhaust line configured for receiving a flow of gas from the fuel cell and including a flow of hydrogen gas; and
    the mixing chamber disposed to receive the flow of hydrogen gas and configured for mixing a flow of air with the flow of hydrogen gas, wherein the mixing chamber includes a mixing mesh including at least one tab feature configured for altering a flow direction of the flow of hydrogen gas and for creating a turbulent flow region within the mixing chamber.

9. The fuel cell system of claim 8, wherein the mixing mesh further includes a wire frame formed in a closed polygonal shape; and
    wherein the at least one tab feature is connected to the wire frame.

10. The fuel cell system of claim 9, wherein the wire frame is disposed in a perpendicular orientation to a longitudinal axis of the mixing chamber;
    wherein the mixing mesh includes a plurality of tab features; and
    wherein at least one of the plurality of tab features is angled away from the perpendicular orientation of the wire frame.

11. The fuel cell system of claim 8, wherein the mixing chamber includes cylindrical walls.

12. The fuel cell system of claim 8, wherein the mixing chamber includes a tapered portion.

13. The fuel cell system of claim 8, wherein the mixing chamber includes an expanding portion.

14. The fuel cell system of claim 8, wherein the mixing chamber includes:
    a first end configured for receiving the flow of hydrogen gas from the fuel cell exhaust line;
    a tapered portion connected to the first end and including the mixing mesh;
    a cylindrically-shaped center portion connected to the tapered portion; and
    an expanding portion connected to the cylindrically-shaped center portion.

15. A vehicle including a fuel cell system including a mixing chamber configured for dilution of hydrogen concentration in a fuel cell exhaust gas flow, the vehicle comprising:
    a fuel cell including an anode and a cathode;
    a fuel cell exhaust line configured for receiving a flow of gas from the fuel cell and including a flow of hydrogen gas; and
    the mixing chamber disposed to receive the flow of hydrogen gas and configured for mixing a flow of air with the flow of hydrogen gas, wherein the mixing chamber includes a mixing mesh including at least one tab feature configured for altering a flow direction of the flow of hydrogen gas and for creating a turbulent flow region within the mixing chamber.

16. The vehicle of claim 15, wherein the mixing mesh further includes a wire frame formed in a closed polygonal shape; and
    wherein the at least one tab feature is connected to the wire frame.

17. The vehicle of claim 16, wherein the wire frame is disposed in a perpendicular orientation to a longitudinal axis of the mixing chamber;
    wherein the mixing mesh includes a plurality of tab features; and
    wherein at least one of the plurality of tab features is angled away from the perpendicular orientation of the wire frame.

18. The vehicle of claim 15, wherein the mixing chamber includes a tapered portion.

19. The vehicle of claim 15, wherein the mixing chamber includes an expanding portion.

20. The vehicle of claim 15, wherein the mixing chamber includes:
    a first end configured for receiving the flow of hydrogen gas from the fuel cell exhaust line;
    a tapered portion connected to the first end and including the mixing mesh;

a cylindrically-shaped center portion connected to the tapered portion; and an expanding portion connected to the cylindrically-shaped center portion.

\* \* \* \* \*